US006272000B1

(12) United States Patent
Spaunhorst et al.

(10) Patent No.: US 6,272,000 B1
(45) Date of Patent: Aug. 7, 2001

(54) CIRCUIT BOARD BLADE FUSE

(75) Inventors: Vernon R. Spaunhorst, Washington; John E. Hunkins, Ballwin; Curtis R. Green, St. Charles; Terry E. Rupp, Fenton, all of MO (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 09/538,070

(22) Filed: Mar. 29, 2000

Related U.S. Application Data

(60) Provisional application No. 60/130,354, filed on Apr. 21, 1999.

(51) Int. Cl.[7] .............................. H02H 5/04; H01R 4/48

(52) U.S. Cl. .......................... 361/104; 439/830; 439/870

(58) Field of Search .................................. 361/103, 104; 439/43–45, 78, 81, 82–84, 292, 293, 295, 324, 329, 345, 346, 350, 352–354, 366, 620, 621, 828, 830, 834, 863, 870, 871, 872

(56) References Cited

U.S. PATENT DOCUMENTS

| | | | | |
|---|---|---|---|---|
| 3,786,402 | * | 1/1974 | Horecky | 439/872 |
| 4,343,530 | * | 8/1982 | Leger | 439/870 |
| 4,612,539 | * | 9/1986 | Gurevich et al. | 337/255 |

* cited by examiner

*Primary Examiner*—Ronald W. Leja

(74) *Attorney, Agent, or Firm*—Armstrong Teasdale LLP

(57) ABSTRACT

A fuse includes a housing and terminal blades extending therefrom. Each terminal blade includes a stop face, a stop brace, a hold face, and a hold brace. The stop face and stop brace prevent over insertion of the terminal blade through a circuit board and separate the fuse housing from the circuit board. The stop brace and hold brace position the housing relative to the board and prevent dislodging of the blades from the board during soldering operations.

22 Claims, 3 Drawing Sheets

CIRCUIT BOARD BLADE FUSE

CROSS REFERENCE TO RELATED APPLICATIONS

This application claims the benefit of U.S. Provisional Application No. 60/130,354, filed Apr. 21, 1999.

BACKGROUND OF THE INVENTION

This invention relates generally to blade-type fuses and, more particularly, to blade-type fuses for being secured to circuit boards.

Fuses are widely used as overcurrent protection devices to prevent costly damage to electrical circuits. One type of fuse for personal computer power supplies is a blade-type fuse. The blade-type fuse includes a plastic housing, two electrical conducting terminal blades extending from the housing, and a fusible link connected between the terminal blades within the housing. The terminal blades are inserted through openings in a printed circuit board and soldered to the board to complete an electrical connection through the fusible link. In operation, when the current approaches unacceptable limits, the link melts and opens the circuit to prevent electrical component damage.

Fuses and other components are typically secured to a circuit board by soldering. Wave soldering is one known soldering technique that is simple and reliable. With wave soldering, the electrical components are stuffed onto a printed circuit board, a solder flux is applied to the board, the board is preheated, and the board is transported across one or several solder waves.

Proper location of a fuse on the circuit board is important to provide a desired electrical connection. For example, if the fuse housing contacts the board when terminal blades are inserted through the board, solder wicking and the creation of an electric path around the fuse may result. Also, a portion of the blade terminal that extends, or protrudes, from a bottom of the board typically must be trimmed after soldering to prevent undesired electrical contacts between the terminals and other components.

Accordingly, it would be desirable to provide a blade-type fuse that facilitates the proper location of a fuse with respect to a circuit board to prevent the fuse housing from resting on a surface of the board and that eliminates a need to trim the terminals after soldering.

BRIEF SUMMARY OF THE INVENTION

In an exemplary embodiment of the invention, terminal blades extending from a housing of a fuse include stop portions and hold portions to facilitate properly locating a fuse with respect to a circuit board. Particularly, and in the exemplary embodiment, the blades have opposite flat faces and include stop portions configured to prevent the blades from being inserted through a printed circuit board for more than a predetermined distance. The hold portions are configured to hold the fuse housing in a separated position from the surface of the board during soldering.

More particularly, and in the exemplary embodiment, the stop portion of each blade includes a projection configured to extend from at least one of the flat faces of the blades. The stop portion is dimensioned so that the blade and projection together have a cross-sectional area greater than the area of the blade terminal opening in a circuit board so that the blade cannot be inserted through the circuit board opening beyond the stop portion. By locating the stop portion a selected distance from the bottom of the blade housing along a longitudinal axis of the blade, the stop portion prevents the blade fuse housing from resting on a surface of the board.

The hold portion also includes a projection configured to extend from at least one flat face of the blades. The hold portion projection is separated from the stop portion projection and has a cross sectional area smaller than the stop portion projection so that the hold portion projection and blade may be inserted through the blade terminal opening in a printed circuit board. The hold portion is positioned at a distal end of the blade, and facilitates maintaining the blade terminals in place during handling and soldering of the boards.

The above-described stop portion prevents the fuse housing from contacting the board surface as the terminal blades are inserted into the circuit board. Therefore, solder wicking and the creation of electrical paths around the fuse are avoided. In addition, the stop and hold portions maintain the fuse in place during handling and soldering operations, thereby preventing the terminals from dislodging from the circuit board during handling and/or soldering. The stop and hold portions also eliminate trimming of the terminal blades, providing further cost savings and reducing manufacturing time.

DETAILED DESCRIPTION OF THE INVENTION

Figure 1:
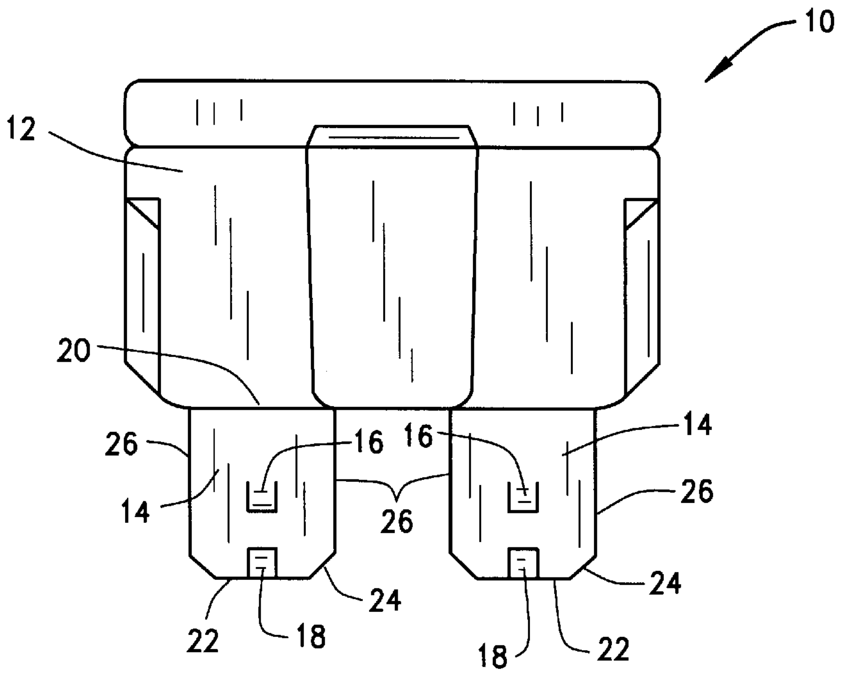
FIG. 1 is a front elevational view of a first embodiment of a fuse.

FIG. 1 is a front elevational view of a fuse 10 including a housing 12 and two blades 14 extending therefrom. Each blade 14 includes a stop portion 16 and a hold portion 18 to prevent blade insertion through a printed circuit board (not shown in FIG. 1) beyond a predetermined point and to hold blades 14 to the board during soldering operations.

The printed circuit board is made of a dielectric substrate or substrates. Circuitry is chemically formed on the substrates, and fuses 10 are connected to the circuits to protect the circuits from damaging overcurrents. There are generally four types of circuit boards, namely, single side, double side, flex, and multilayer. Single mount boards have circuitry on one side of the board, and may or may not include openings drilled through the board for mounting of components. Double sided boards have circuitry on both sides of the board, drilled openings in the board for the mounting of electrical components, and electroplated walls to allow for electrical continuity between the sides of the board. Flex boards have multilayered circuitry overcoated with a flexible film. Electrical continuity of flex boards is commonly achieved in a manner similar to double sided boards. Multilayer boards are similar to double sided boards but are bonded together in a stack. Fuse 10 may be used in connection with many different types of circuit boards, including the types of boards described above.

Fuse housing 12 is a molded plastic construction that encapsulates terminal blades 14 and a fusible link (not shown) electrically connecting blades 14. Terminal blades 14 extend from a bottom 20 of housing 12. Housing 12 is dimensioned to facilitate insertion of terminal blades 14 into the circuit board and protects the fusible link from severance or disconnection during handling of fuse 10.

Terminal blades 14 extend from within housing 12 and include distal ends 22. Distal ends 22 include chamfers 24 to guide blades 14 into proper position as blades 14 are inserted through openings in the circuit board. Terminal blades 14 are fabricated from an electrically conductive material and are configured in accordance with the desired voltage and current rating of fuse 10. Each blade 14 also includes a stop portion 16 and a hold portion 18. In one embodiment, stop portion 16 and hold portion 18 are punched or sheared from blades 14 on three sides and the free end bent upwardly with respect to flat portions 28, 30 of blades 14. In alternative embodiments, stop portion 16 and hold portion 18 are formed using other known fabrication methods, including but not limited to die casting, skiving, and machining of blades 14 with stop and hold portions 16, 18.

In the illustrated embodiment, stop portion 16 and hold portion 18 partially span a width of each blade 14 and are approximately centered between a pair of side edges 26 of blade 14. In an alternative embodiment, stop portion 16 and hold portion 18 are located on one blade only. In another alternative embodiment, both stop portion 16 and hold portion 18 are located on one blade 14, and only one of stop portion 16 and hold portion 18 is located on the other blade 14. In yet another embodiment, only stop portion 16 or hold portion 18 is provided on each blade 14.

Figure 2:
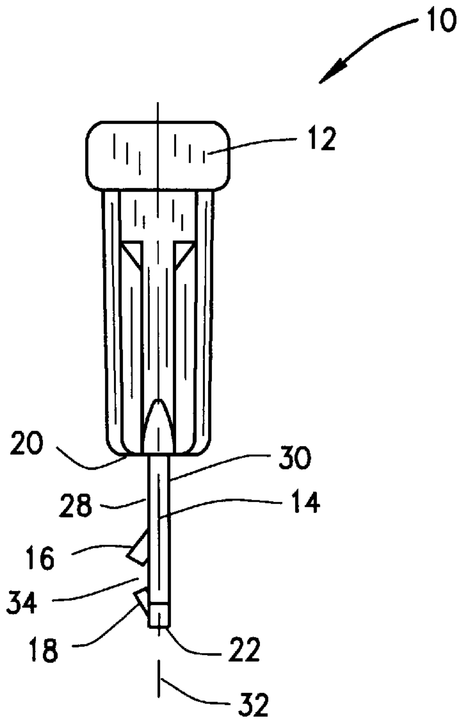
FIG. 2 is a side elevational view of the fuse of FIG. 1.

FIG. 2 is a side view of fuse 10. Blades 14 have a first flat face 28 and a second flat face 30. Stop portion 16 is separated from bottom 20 of housing 12 along longitudinal axis 32 of blade 14 and extends from first blade face 28. Hold portion 18 is separated from stop portion 16 along longitudinal axis 32 and also extends from first blade face 28. Thus, a gap 34 between stop portion 16 and hold portion 18 is created that, in a particular embodiment, is less than the thickness of a circuit board (not shown). Hold portion 18 is positioned adjacent distal end 22 of said blade 14. In an alternative embodiment, stop portion 16 and hold portion 18 are connected to different faces 28, 30 of blade 14.

Figure 3:
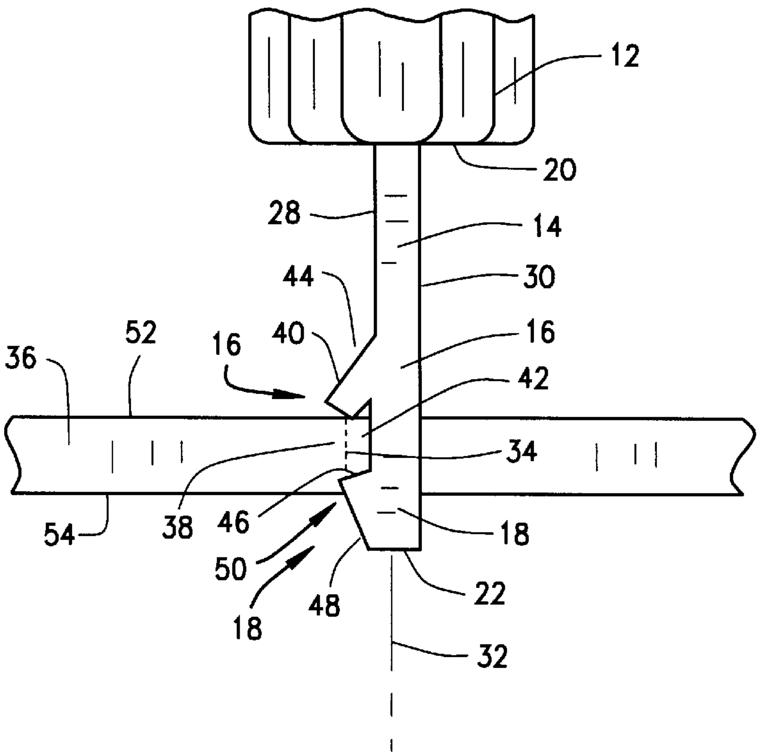
FIG. 3 is an enlarged view of a portion of the fuse of FIG. 1 connected to a circuit board.

FIG. 3 is an enlarged view of a portion of fuse 10 connected to a printed circuit board 36. Stop portion 16 includes a stop face 38 and a stop brace 40. Stop face 38 is substantially flat and extends obliquely to first face 28 of blade 14. Stop face 38 is substantially rectangular, and is dimensioned so that the thickness of blade 14 and stop face 38 is larger than a blade terminal opening 42 in circuit board 36. Stop brace 40 extends from stop face 38 and includes a top surface 44 that is sloped toward blade first face 28, and stop portion 16 is separated from bottom 20 of fuse housing 12 along longitudinal axis 32 of blade 14.

Hold portion 18 includes a hold face 46 and a hold brace 48. Hold face 46 is substantially flat and extends obliquely to first blade face 28. Hold face 46 is substantially rectangular and dimensioned so that the thickness of blade 14 and hold face 46 is smaller than a thickness of blade 14 and stop face 38. In alternative embodiments, other shapes of faces 38, 46 and braces 40, 48 are employed for stop portions 16 and hold portions 18. For instance, stop face and hold face may extend substantially perpendicularly to blade first face 28 so that stop portion 16 and hold portion 18 are substantially triangular in profile.

Hold face 46 extends obliquely to stop face 38 and is separated from stop face 38 by gap 34. Hold brace 48 extends from hold face 46 and includes a top surface 50 that is sloped toward first blade face 28. Thus, hold portion 18 is substantially triangular. Hold brace 48 and blade face 28 converge adjacent distal end 22 of blade 14.

When fuse 10 is inserted into circuit board 36, terminal blades 14 are inserted through blade terminal opening 42 in circuit board 36 until stop face 38 contacts a first side 52 of circuit board 36 and cooperates with stop brace 40 to prevent further insertion of blade 14. Hold face 48 is dimensioned to engage circuit board blade terminal opening 42 with an interference fit to prevent terminal blades 14 from dislodging from circuit board 36 during wave soldering. The relative position of stop portion 16 and hold portion 18 with respect to blade distal end 22 determines the blade length that protrudes through circuit board 36 after blade 14 is inserted. Thus, excess terminal length protruding through second side 54, i.e., the bottom of circuit board 36, is eliminated and the costs of trimming the terminals saved.

The separation of the stop portion 16 and fuse housing 12 along longitudinal axis 32 of blade 14 prevents housing 12 from contacting the surface of the board. Solder wicking and the creation of electrical paths around the fuse are therefore avoided.

Figure 4:
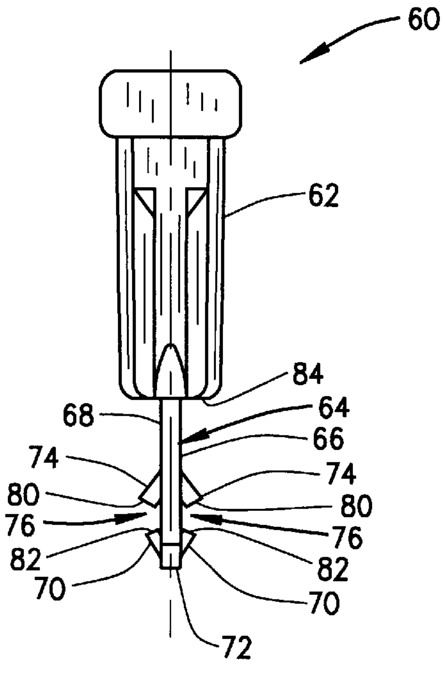
FIG. 4 is a side elevational view of a second embodiment of a fuse.

FIG. 4 is a side view of a second embodiment of a fuse 60 including a housing 62 and a pair of terminal blades 64 extending therefrom. Each blade includes a first flat face 66 and an opposed second flat face 68. A hold portion 70 is located adjacent distal ends 72 of each terminal blade 64 and extends from first face 66 and second face 68, respectively, of each blade 64. A stop portion 74 is located a distance from hold portion 70 on each terminal blade 64 and extends from first face 66 and second face 68, respectively, of each blade 64 to form a gap 76 between a stop portion stop face 80 and a hold portion hold face 82 of each blade 64. Hold face 82 of each blade 64 is dimensioned to allow insertion of hold portion 70 through an opening (not shown in FIG. 4) of a printed circuit board (not shown in FIG. 4) while stop face 80 is dimensioned to prevent insertion of stop portion 74 through the opening of the printed circuit board. Therefore, when terminal blades 64 are inserted into the circuit board, stop face 80 contacts a top surface (not shown) of the printed circuit board and prevents a bottom 84 of housing 62 from contacting the top surface of the printed circuit board.

While in the illustrated embodiment, stop portions 74 and hold portions 70 are dimensioned approximately equally on each blade 64, in alternative embodiments stop face 80 and hold face 82 of each blade 64 are dimensioned differently so that fuse 60 may be installed into the printed circuit board only in a pre-selected orientation determined by the dimensions of openings in the printed circuit board.

Figure 5:
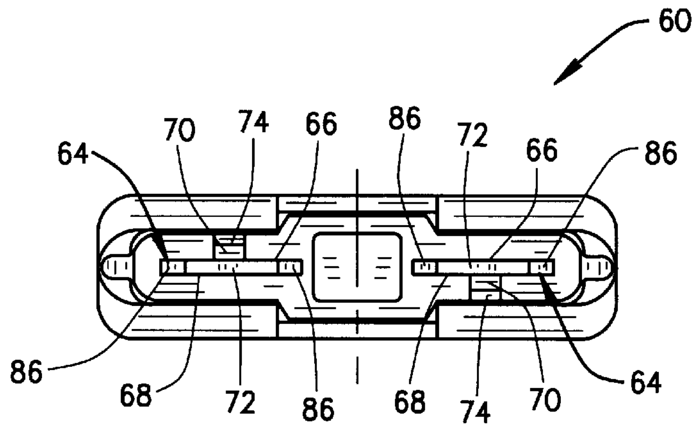
FIG. 5 is an end view of the fuse shown in FIG. 4.

FIG. 5 is an end view of fuse 60 illustrating terminal blades 64 with opposed first and second faces 66, 68, and stop and hold portions 74, 70 of one blade 64 extending from first face 66 while stop and hold portions 74, 70 of the other blade 64 extend from second face 68. In the illustrated embodiment, stop and hold portions 74, 70 are substantially centered and span only a portion of a width of each blade 64, while in alternative embodiments stop and hold portions 74, 70 may be off-centered and/or span substantially the entire width of terminal blades 64. Distal ends 72 of terminal blades 64 include chamfers 86 to guide insertion of terminal blades 64 into a printed circuit board (not shown in FIG. 5).

When inserted into the printed circuit board, stop portion 74 and hold portion 70 of each blade 64 is positioned substantially as illustrated and described in relation to FIG. 3. Therefore, prevention of solder wicking and creation of electrical paths around fuse 60 is accomplished, and the cost of trimming blade terminals 64 is saved.

Figure 6:
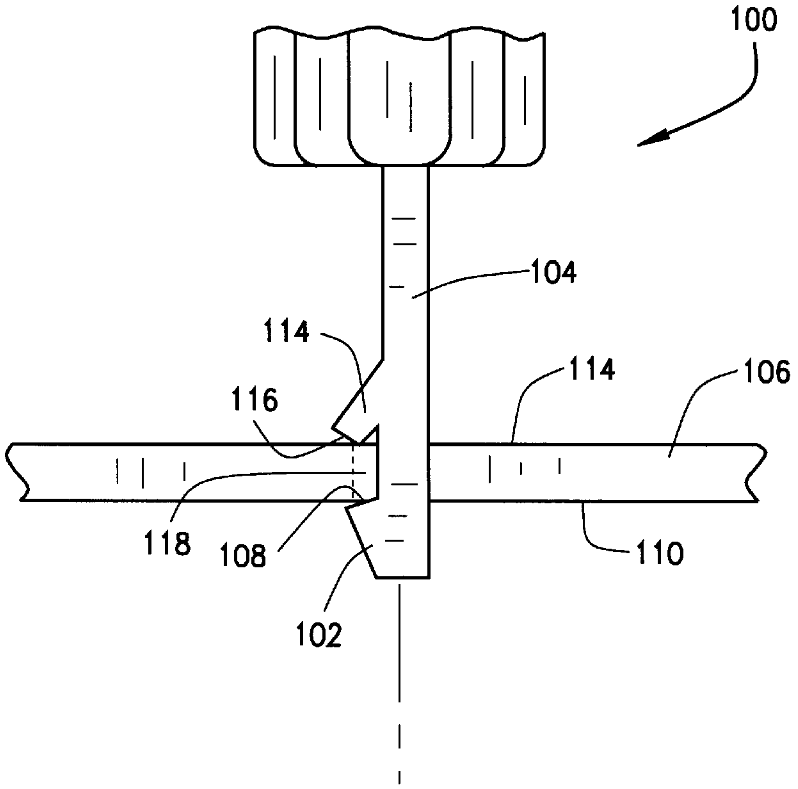
FIG. 6 is a view similar to FIG. 3 but illustrating a third embodiment of a fuse connected to a circuit board.

FIG. 6 is an enlarged view of a portion of a third embodiment of a fuse 100 including a hold portion 102 of a terminal blade 104 inserted completely through a circuit board 106 so that a hold face 108 contacts a second surface 110 of circuit board 106. Thus, circuit board 106 is retained between a stop portion 112 contacting a first surface 114 of circuit board 106 and stop face 116 contacting circuit board second surface 110. In other words, a gap 118 between stop portion 112 and hold portion 102 is dimensioned approximately equal to the thickness of circuit board 106.

While the invention has been described in terms of various specific embodiments, those skilled in the art will recognize that the invention can be practiced with modification within the spirit and scope of the claims.

What is claimed is:

1. A fuse for a circuit board, the circuit board including a first surface and a plurality of openings therethrough, said fuse comprising:

a housing; and first and second blades extending from the housing, at least one of said first and second blades comprising a pair of side edges and a flat face extending therebetween, and a first stop portion upwardly sloped from said flat face to prevent insertion of said blade through the opening beyond a predetermined point when said blades are inserted through the openings.

2. A fuse in accordance claim 1 wherein said at least one blade comprises a distal end, said first stop portion extending from said flat face toward said distal end.

3. A fuse in accordance with claim 2 wherein said first stop portion comprises a stop face.

4. A fuse in accordance with claim 3 wherein said stop face is oblique to said flat face.

5. A fuse in accordance with claim 2 wherein said first blade comprises a first face and said second blade comprises a second face opposed to said first face, said first stop portion extending from said first face, said fuse further comprising a second stop portion extending from said second face.

6. A fuse in accordance with claim 2 wherein said at least one blade further comprises a hold portion separated from said first stop portion and configured to engage one of the circuit board openings.

7. A fuse in accordance with claim 1 wherein at least one of said blades is further configured to prevent said blades from disconnecting with the circuit board after being inserted through the board a predetermined amount.

8. A fuse in accordance claim 7 wherein said at least one blade configured to prevent disconnection comprises a flat portion and a first hold portion.

9. A fuse in accordance with claim 8 wherein each of said first and second blades comprises a first face and an opposed second face, said first hold portion extending from said first face of said first blade, said fuse further comprising a second hold portion extending from said second face of said second blade.

10. A fuse in accordance with claim 8 wherein said first hold portion comprises a hold face, said hold face extending obliquely to said flat portion.

11. A fuse in accordance with claim 10 wherein said first hold portion is configured to prevent said blade from disconnecting with the circuit board after said at least one blade is inserted through the board a predetermined amount.

12. A fuse in accordance with claim 11 wherein said at least one blade configured to prevent disconnection further comprises said first stop portion separated from said first hold portion and preventing insertion of said blade into a circuit board beyond said first stop portion.

13. A circuit board assembly comprising:

a circuit board comprising at least a first surface, a second surface and a plurality of openings therethrough:

a fuse housing; and a first blade and a second blade extending from said housing, each of said first blade and second blade comprising a distal end and a stop portion upwardly sloped toward said distal end for contacting said first surface of said board and a hold portion engaging said circuit board when said blades are inserted through said openings.

14. A circuit board assembly in accordance with claim 13 wherein said stop portion comprises a stop face extending from each said blade, said hold portion comprising a hold face extending from each said blade, said stop face separated from said hold face on each blade.

15. A circuit board assembly in accordance with claim 14 wherein each said blade comprises a first surface and an opposed second surface, said stop face of said first blade extending from said first surface, said stop face of said second blade extending from said second surface.

16. A circuit board assembly in accordance with claim 15 wherein said stop face and said hold face are substantially parallel to one another.

17. A circuit board assembly in accordance with claim 14 wherein said stop portion further comprises a stop brace including a top surface, said hold portion comprises a hold brace including a top surface, said stop brace top surface and said hold face top surface are oblique to said stop face and said hold face.

18. A circuit board assembly in accordance with claim 17 wherein said blades further include distal ends, said stop brace top surface extending toward said distal end of said blade.

19. A circuit board assembly in accordance with claim 17 wherein said top surface of said stop brace extends to said blade, said stop brace top surface separated from said housing.

20. A circuit board assembly in accordance with claim 14 wherein said hold face contacts said second surface when said blades are inserted through said openings.

21. A fuse for a circuit board, the circuit board including a first surface and a plurality of openings therethrough, said fuse comprising:

a housing; and first and second blades extending from the housing, each of said first and second blades comprising a distal end, first and second lateral sides, and a flat face extending between said lateral sides to said distal end, at least one of said first and second blades comprising a sloped stop portion substantially centered between said lateral sides and configured to contact the first surface of the board and prevent insertion of said blade through the opening beyond a predetermined point when said blades are inserted through the openings.

22. A fuse for a circuit board, the circuit board including a first surface and a plurality of openings therethrough, said fuse comprising:

a housing;

first and second blade terminals extending from said housing, each of first and second blade terminals comprising opposed flat faces extending between lateral sides, at least one of said flat faces comprising a sloped stop portion configured to prevent insertion of said first and second blade terminals through the openings beyond a predetermined point, and at least one of said flat faces comprising a hold portion configured to secure said blade terminal to the opening of the board with an interference fit.

* * * * *